No. 832,873. PATENTED OCT. 9, 1906.
W. McCARTHY.
CORN PLANTER.
APPLICATION FILED MAR. 29, 1906.

2 SHEETS—SHEET 1.

Witnesses:
Dow W. Vorhies
Stella Snider

Inventor:
William McCarthy,
By E. T. Silvius,
Attorney.

No. 832,873. PATENTED OCT. 9, 1906.
W. McCARTHY.
CORN PLANTER.
APPLICATION FILED MAR. 29, 1906.

2 SHEETS—SHEET 2.

Witnesses:
Dow W. Vorhees.
Stella Snider.

Inventor:
William McCarthy,
By E. T. Silvius,
Attorney.

THE NORRIS PETERS CO., WASHINGTON, D. C.

UNITED STATES PATENT OFFICE.

WILLIAM McCARTHY, OF LEBANON, INDIANA.

CORN-PLANTER.

No. 832,873.     Specification of Letters Patent.     Patented Oct. 9, 1906.

Application filed March 29, 1906. Serial No. 308,643.

*To all whom it may concern:*

Be it known that I, WILLIAM McCARTHY, a citizen of the United States, residing at Lebanon, in the county of Boone and State of Indiana, have invented new and useful Improvements in Corn-Planters; and I do declare the following to be a full, clear, and exact description of the invention, reference being had to the accompanying drawings, and to the letters of reference marked thereon, which form a part of this specification.

This invention relates to corn-planting machines, and has reference particularly to the seed-dropping apparatus thereof.

Objects of the invention are to provide apparatus which may be applied to various patterns of planters for operating the dropping devices thereof periodically, so as to drop the corn in hills equal distances apart in rows without requiring the knotted lines heretofore made use of for the purpose, to provide simple relatively inexpensive seed-dropping apparatus which will be durable and economical in use, and to provide simple means whereby the apparatus may be connected and disconnected operatively with respect to the planter mechanism.

With the above-mentioned and minor objects in view the invention consists in novel tripping mechanism operatively connected with the driving-axle of a corn-planter coöperating with the dropping apparatus of the planter, means for disconnecting the tripping mechanism from the axle, and novel means for setting or resetting the tripping mechanism at the beginning of rows for planting in check-row order; and the invention consists, further, in the novel parts and the combinations and arrangements of parts, as hereinafter particularly described, and referred to in the appended claims.

Figure 1:
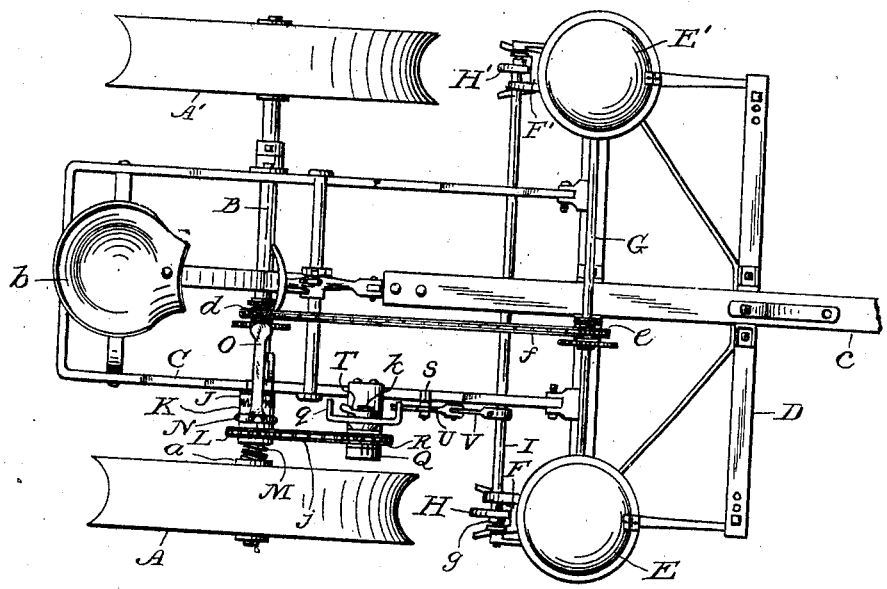
Figure 2:
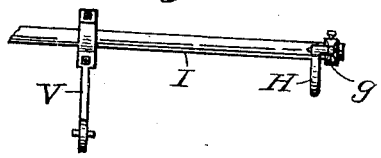
Figure 3:
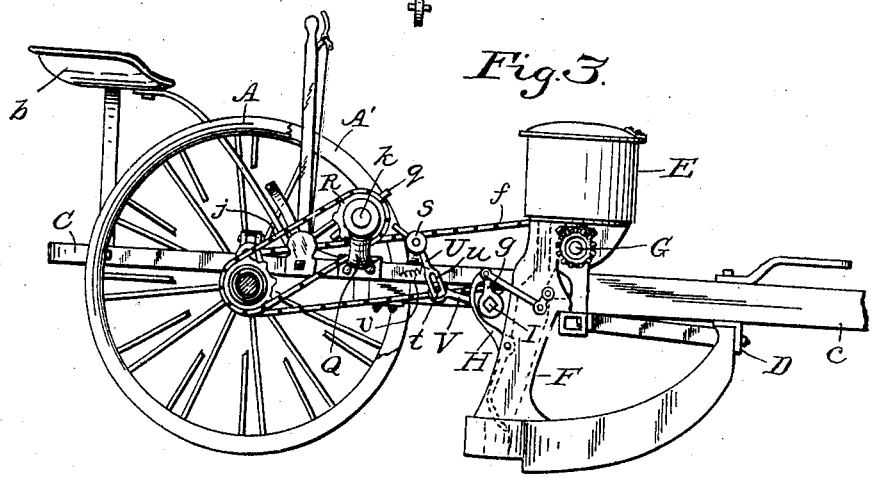
Figure 4:
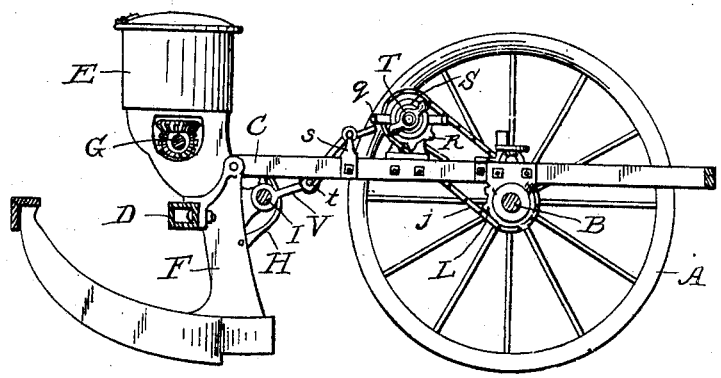
Figure 5:
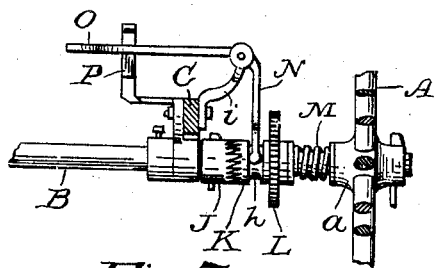
Figure 6:
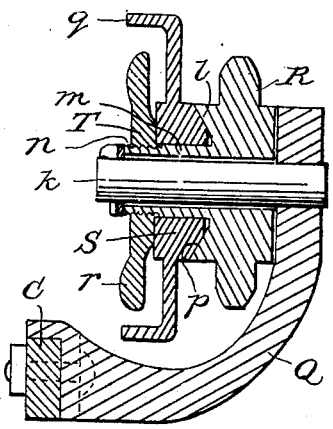
Figure 7:
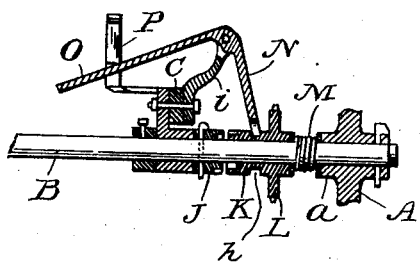
Figure 8:
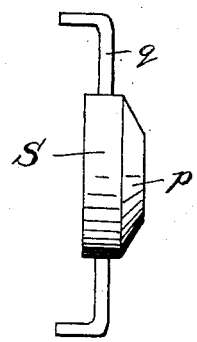
Figure 9:
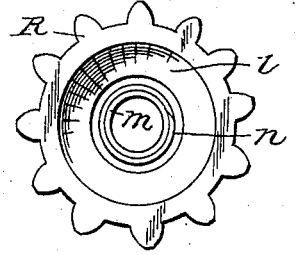
Figure 10:
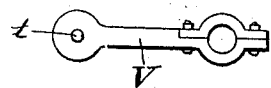

Referring to the drawings, Figure 1 is a top plan of a common type of corn-planter provided with the improved apparatus for operating the dropping mechanism thereof; Fig. 2, a fragmentary view of the rock-shaft of the dropping mechanism detached from the planter; Fig. 3, a side elevation of the planter with parts thereof broken away and showing the check-row apparatus connected to the drive-axle; Fig. 4, a fragmentary longitudinal sectional view taken on a vertical plane near the middle parts of the machine; Fig. 5, a fragmentary elevation showing in detail the clutch for driving the seed-dropping apparatus; Fig. 6, a sectional detail view of the adjuster for resetting the tripping devices; Fig. 7, a vertical sectional view of the clutch mechanism on the drive-axle; Fig. 8, a side elevation of a part of the adjuster having trip-fingers thereon; Fig. 9, a front elevation of a sprocket-wheel forming a part of the adjuster, and Fig. 10 a side elevation of an arm of the rock-shaft of the dropping mechanism.

Similar reference characters in the different figures of the drawings designate corresponding elements or features.

In the drawings, A and A' designate the carrying and covering wheels; B, the drive-axle, which is secured to the hub $a$ of the wheel A, and thereby rotated; C, the main frame mounted on the axle and supporting the seat $b$; D, the forward-tilting or runner frame connected to the main frame and having the tongue $c$ attached thereto; E and E', the seedboxes; F and F', the seed-tubes (or boots) for conveying the seed from the seedboxes to the ground; G, the rotative shaft which operates the seed-plates or devices in the seedboxes for feeding the seed into the seed-tubes; H and H', the droppers and valves that operate in the seed-tubes; I, the rock-shaft that operates the droppers; and $d$, $e$, and $f$, the gearing by which the axle B drives the shaft G for feeding the seed to the droppers, arms $g$ on the rock-shaft being connected to the droppers. The above-mentioned elements will be understood as being commonly embodied in check-row corn-planters, and heretofore suitable trip devices have been connected to the rock-shaft I and adapted to be actuated by a stretched knotted line or a wire provided with buttons or the like for spacing the hills, said type of trip devices being omitted in the present invention.

The improved apparatus comprises in practice a clutch member J, that is secured to the axle B, and a clutch member K, that is rotative on the axle and has a sprocket-wheel L attached thereto, the member K having a groove $h$ in its periphery. A coil-spring M encircles the axle between the hub $a$ of the wheel A and the member K, normally forcing the latter member into engagement with the member J. A bracket $i$ is attached to the frame C and pivotally supports a bell-crank having an arm N extending into the groove h of the clutch member K for disengaging the latter from the other clutch member, the bell-crank having also an arm O, serving as a foot-lever for actuating the arm N. A spring-latch P is attached to the frame C for holding the arm O when depressed, so as to hold the member K away from the member J, thus permitting the axle to rotate without moving the sprocket-wheel L, the wheel having a drive-chain j thereon for imparting motion to the tripping mechanism.

A bracket Q is attached to the frame C and supports an axle k, on which a sprocket-wheel R is journaled, and in connection with the drive-chain j. The wheel R has a clutch-face l and also a hub m, extending beyond the face and having an external screw n. A clutch-ring S is journaled on the hub m and has a clutch-face p, formed as a coacting companion to the face l of the wheel R. The clutch-faces may be variously formed in shape, preferably smooth, so as to engage frictionally one with the other; but obviously they may be more or less roughened or provided with small teeth. The ring S has a suitable number of trip-fingers q attached thereto, two fingers being preferable. A screw-nut T is placed on the screw n for binding the ring S to the wheel R, the nut having an operating-lever r attached thereto. Preferably the nut should have two levers, so that one may balance the other.

A bracket s is attached to the frame C and pivotally supports a lever U, which is journaled between its ends, one end of the lever being in the path of the fingers q, so as to be periodically engaged thereby, the other end of the lever being connected with the free end of an arm V, that is attached to the rock-shaft I, the arm having a pin t extending into a slot u, that is formed in the lever U, so that when the lever U moves with rocking motion the arm V will also move with it, and therefore rock the shaft I, and thereby operate the seed-droppers H and H', connected therewith. The seed-droppers may be held normally in closed positions by any suitable means, the weight of the arm V and the connected end of the lever U provided with a spring v usually being sufficient for the purpose, although the droppers are commonly provided with a suitable spring for closing them instantly after having been opened, as will be understood. The spring may be arranged in any suitable position.

In practical use the rotation of the shaft G will cause the seed to be fed as usual from the seedboxes to the droppers H and H', as will be understood, while the machine moves to the starting-point of a row, with the clutch member K disengaged from the member J. The machine should be stopped at the proper position with the seed-tubes F and F' at the starting-line. Then the nut T should be loosened and the lever O should be released in order that the wheel L may be operatively connected with the axle B, after which the ring S should be rotated until a finger q engages the lever U and trips it, so as to cause the operation of the droppers H and H', thereby dropping the first hill on the starting-line. Then the nut T should be tightened, so that the fingers q may be put in motion by means of the wheel R, after which the planter may be drawn across the field, the wheel A measuring the distances for the hills of corn and driving the seed-dropping apparatus.

Having thus described the invention, what is claimed as new is—

1. In a corn-planter, the combination with a pair of carrying and covering wheels, a drive-axle secured to one of the wheels, and a main frame mounted on the axle, of a clutch member secured to the axle, a grooved clutch member rotative on the axle and provided with a sprocket-wheel, a spring coiled on the axle between the grooved clutch member and the hub of the wheel that has the drive-axle secured thereto, a bracket attached to the frame, a bell-crank pivoted to the bracket and having an arm extending into the groove of the clutch member and having also an arm formed as a foot-lever, a spring-latch mounted on the frame in engagement with the foot-lever arm, and a sprocket-chain on the sprocket-wheel, with tripping mechanism for the seed-droppers of the corn-planter connected with the sprocket-chain, substantially as set forth.

2. In a corn-planter, the combination with a sprocket-wheel, a drive-axle carrying the sprocket-wheel, a main frame, seedboxes, and dropping mechanism having a rock-shaft provided with an arm, of a bracket attached to the main frame, an axle supported by the bracket, a driving sprocket-wheel journaled on the axle and having a clutch-face and also a hub extending beyond the clutch-face and having an external screw, a sprocket-chain connecting the two sprocket-wheels, a clutching-ring journaled on the hub of the sprocket-wheel and having a clutch-face opposed to the clutch-face of the sprocket-wheel, a trip-finger attached to the clutch-ring, a screw-nut movable on the external screw and having an operating-lever, and a lever mounted on the frame in the path of the trip-finger and connected to the arm of the rock-shaft, substantially as set forth.

3. In a corn-planter, the combination of carrying and covering wheels, a drive-axle, a main frame, a tilting frame, seedboxes on the tilting frame with feeding devices operated by the drive-axle, seed-tubes with seed-droppers and valves, a rock-shaft connected with the seed-droppers and valves and provided with an arm having a pin, a lever pivotally mounted on the main frame and having a slot receiving the pin of the arm, a spring connected to the lever, and a trip-finger mounted on the main frame to engage the lever and connected operatively with the drive-axle.

In testimony whereof I affix my signature in presence of two witnesses.

WILLIAM McCARTHY.

Witnesses:
 B. F. KUDRICH,
 ZANTA V. PAVEY.